United States Patent
Bataweel et al.

(10) Patent No.: US 11,091,688 B2
(45) Date of Patent: Aug. 17, 2021

(54) HYDROCARBON WELL DELIQUIFICATION USING ALKALI METAL SILICIDES

(71) Applicant: Saudi Arabian Oil Company, Dhahran (SA)

(72) Inventors: Mohammed Bataweel, Dhahran (SA); Prasad Baburao Karadkar, Al-Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 61 days.

(21) Appl. No.: 16/275,461

(22) Filed: Feb. 14, 2019

(65) Prior Publication Data

US 2020/0263078 A1 Aug. 20, 2020

(51) Int. Cl.
*E21B 43/12* (2006.01)
*C09K 8/588* (2006.01)

(52) U.S. Cl.
CPC ............ *C09K 8/588* (2013.01); *E21B 43/122* (2013.01)

(58) Field of Classification Search
CPC .............................. C09K 8/588; E21B 43/122
See application file for complete search history.

(56) References Cited

U.S. PATENT DOCUMENTS

| | | |
|---|---|---|
| 3,164,206 A | 1/1965 | Sharp |
| 3,316,968 A | 5/1967 | Nettles et al. |
| 4,085,799 A | 4/1978 | Bousaid et al. |
| 4,178,993 A | 12/1979 | Richardson et al. |
| 4,785,880 A | 11/1988 | Ashton |
| 5,092,983 A | 3/1992 | Eppig et al. |
| 5,246,072 A | 9/1993 | Frazier, Jr. et al. |
| 5,251,700 A * | 10/1993 | Nelson ..................... B09C 1/06 166/305.1 |
| 6,302,209 B1 | 10/2001 | Thompson, Sr. et al. |
| 7,811,541 B2 * | 10/2010 | Lefenfeld ................. C01B 3/06 423/344 |
| 7,946,342 B1 | 5/2011 | Robertson |
| 8,950,494 B2 | 2/2015 | Nguyen et al. |
| 9,140,107 B2 | 9/2015 | Abad et al. |

(Continued)

FOREIGN PATENT DOCUMENTS

| | | |
|---|---|---|
| EP | 2640803 B1 | 6/2016 |
| JP | H05193923 A | 8/1993 |

(Continued)

OTHER PUBLICATIONS

Arachman, F. et al., Liquid Unloading in a Big Bore Completion: A Comparison Among Gas Lift, Intermittent Production, and Installation of Velocity String, SPE Asia Pacific Oil and Gas Conference and Exhibition, Perth, Australia, SPE-88523-MS: 14 pages (Oct. 18-20, 2004).

(Continued)

*Primary Examiner* — Silvana C Runyan
(74) *Attorney, Agent, or Firm* — Choate, Hall & Stewart LLP; Charles E. Lyon; Peter A. Flynn

(57) ABSTRACT

Methods and systems for recovering hydrocarbon gas from a subterranean reservoir comprising a wellbore, where hydrocarbon gas flow from the subterranean reservoir is impeded due to collection of liquids, including water, in the wellbore, the methods and systems comprising introducing a composition comprising at least one alkali metal silicide into the wellbore.

26 Claims, 1 Drawing Sheet

(56) References Cited

U.S. PATENT DOCUMENTS

| | | | |
|---|---|---|---|
| 9,267,364 | B2 | 2/2016 | Poindexter et al. |
| 9,657,549 | B2 | 5/2017 | Krumrine et al. |
| 2004/0256104 | A1 | 12/2004 | Wilson et al. |
| 2008/0023203 | A1* | 1/2008 | Steiner .................. E21B 43/121 166/312 |
| 2008/0121391 | A1 | 5/2008 | Durham et al. |
| 2013/0029883 | A1 | 1/2013 | Dismuke et al. |
| 2013/0341023 | A1 | 12/2013 | Krumrine, III et al. |
| 2014/0190694 | A1* | 7/2014 | Liang .................... E21B 43/267 166/280.2 |
| 2014/0196896 | A1* | 7/2014 | Krumrine ................ C09K 8/46 166/270.1 |
| 2014/0296185 | A1 | 10/2014 | Jones et al. |
| 2015/0260022 | A1 | 9/2015 | Enis et al. |
| 2015/0300143 | A1 | 10/2015 | Al-Nakhli et al. |
| 2015/0376999 | A1 | 12/2015 | Abad et al. |
| 2016/0245060 | A1 | 8/2016 | Krumrine et al. |
| 2017/0336032 | A1 | 11/2017 | Krumrine, III et al. |
| 2020/0263079 | A1 | 8/2020 | Bulekbay et al. |

FOREIGN PATENT DOCUMENTS

| | | | |
|---|---|---|---|
| WO | WO-2008/057219 | A2 | 5/2008 |
| WO | WO-2008/118240 | A1 | 10/2008 |
| WO | WO-2012/174255 | A1 | 12/2012 |
| WO | WO-2015/058164 | A1 | 4/2015 |
| WO | WO-2016/174414 | A1 | 11/2016 |
| WO | WO-2020/165634 | A1 | 8/2020 |
| WO | WO-2020/165635 | A1 | 8/2020 |

OTHER PUBLICATIONS

Bowman, Increasing the Production from Marginal Gas Wells, 2006 SPE International Oilfield Corrosion Symposium, Aberdeen, Scotland, U.S., SPE 100514: 5 pages (May 30, 2016).

Carbon Dioxide, Material Safety Data Sheet, Airgas, 7 pages (Date of Preparation/Revision: Jan. 20, 2012). URL: https://louisville.edu/micronano/files/documents/safety-data-sheets-sds/CO2.pdf (Retrieved Apr. 29, 2019).

Clegg, J.D. et al., Recommendations and Comparisons for Selecting Artificial-Lift Methods, Journal of Petroleum Technology, 1128-1167 SPE-24834-PA. (1993). Discussion of Recommendations and Comparisons for Selecting Artificial-Lift Methods, and Authors' Reply to Discussion, 621-622 (1994).

Krumrine, P.H. et al., Alkali Metal Silicides: A New Material for Heavy-Oil Production Processes, SPE Western North American and Rocky Mountain Joint Regional Meeting, Denver, Colorado, USA, SPE-169490-MS: 14 pages (Apr. 16-18, 2014).

Krumrine, P.H. et al., Investigation of Post CHOPS Enhanced Oil Recovery of Alkali Metal Silicide Technology, SPE Heavy Oil Conference-Canada, Alberta, Canada SPE-170141-MS: 17 pages (Jun. 10-14, 2014).

Liu, Y. et al., Size measurement of dry ice particles produced from liquid carbon dioxide, Journal of Aerosol Science, 48: 1-9, 25 pages (2012).

Masa, V. and Kuba, P., Efficient use of compressed air for dry ice blasting, Journal of Cleaner Production, 111: 76-84 (2016).

Price, B.P. and Gothard, B., Foam-Assisted Lift—Importance of Selection and Application, 2007 SPE Production and Operations Symposium, Oklahoma City, Oklahoma, U.S.A., SPE 106465-MS: 5 pages (Mar. 31-Apr. 2, 2007).

International Search Report for PCT/IB19/53452, 5 pages (dated Oct. 15, 2019).

International Search Report for PCT/IB2019/053451, 5 pages (dated Oct. 4, 2019).

Written Opinion for PCT/IB19/53452, 10 pages (dated Oct. 15, 2019).

Written Opinion for PCT/IB2019/053451, 9 pages (dated Oct. 4, 2019).

Zhao, W., Oil Recovery Strategies for Thin Heavy Oil Reserves, University of Calgary, Thesis, pp. 28, 32-34, and 133 (Jan. 2016). URL: http://theses.ucalgary.ca/handle/11023/2743 (Retrieved Apr. 29, 2019).

* cited by examiner

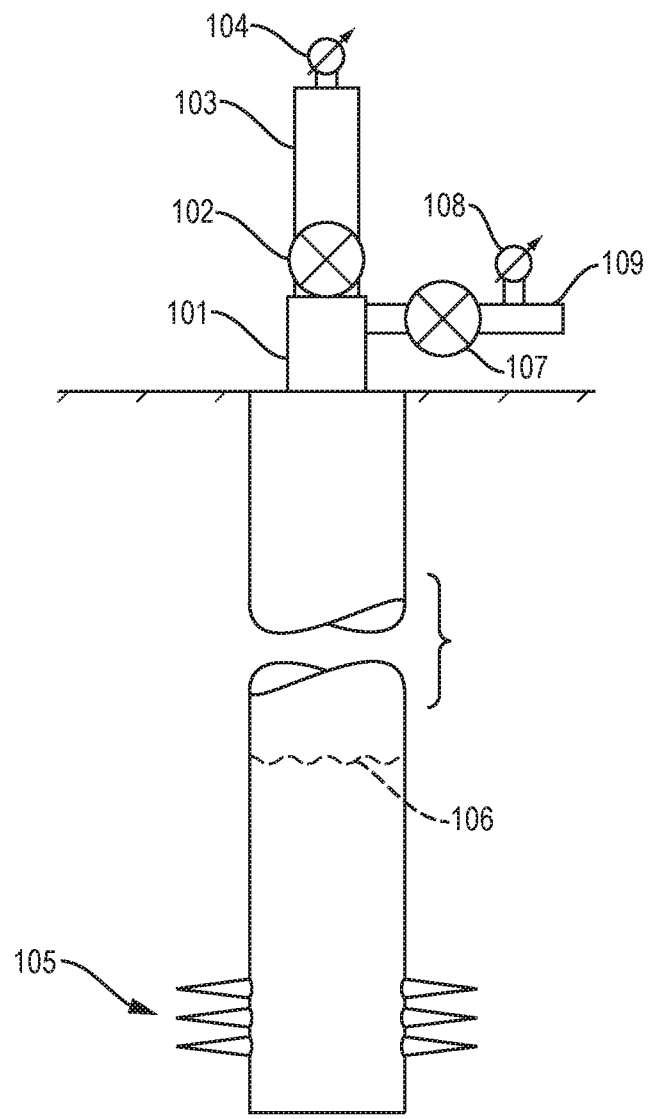

HYDROCARBON WELL DELIQUIFICATION USING ALKALI METAL SILICIDES

BACKGROUND

Mining of natural gas, such as hydrocarbon gas, is primarily achieved by drilling a hole (a "well") into a subterranean reservoir that contains the hydrocarbon gas. The pressure in the subterranean reservoir is generally greater than the pressure on the surface. Once the subterranean reservoir is tapped, the gas travels naturally through the well to the surface, where the pressure is less.

When hydrocarbon gas travels through the well to the surface, liquids, such as crude oil or water, can be pushed along with the gas into the well. Over time, two events generally occur: (1) the rate of hydrocarbon gas exiting the well decreases as the difference in pressure between the reservoir and the surface (in addition to the head pressure) decreases; and (2) liquid condenses and accumulates in the well, forming a "fluid column." The fluid column can form a barrier that prevents hydrocarbon gas from traveling through the well to the surface. This effect is exacerbated as the pressure in the subterranean reservoir decreases and hydrocarbon gases condense. If the fluid cannot be removed, and the gas cannot be lifted out of the well, the well may be prematurely abandoned before the hydrocarbon gas resources in the subterranean reservoir are depleted.

SUMMARY

The present disclosure provides, among other things, methods and systems to address the problem of reduced flow of hydrocarbon gas due to buildup of liquid in a well. In some embodiments, these methods and systems allow for removal of such liquid ("deliquification") without the need for additional drilling or machinery or tubulars.

In some embodiments, the present disclosure provides a method of recovering hydrocarbon gas from a subterranean reservoir comprising a wellbore, where hydrocarbon gas flow from the subterranean reservoir is impeded due to collection of liquids, including water, in the wellbore. In some embodiments, the method comprises introducing a composition comprising at least one alkali metal silicide into the wellbore, where the at least one alkali metal silicide reacts with water in the wellbore to generate heat and hydrogen gas, thereby displacing the liquids from the wellbore and restoring hydrocarbon gas flow from the subterranean reservoir.

In some embodiments, the at least one alkali metal silicide is sodium silicide, lithium silicide, or potassium silicide.

In some embodiments, the composition comprises two or more alkali metal silicides.

In some embodiments, the composition is encapsulated in a polymer.

In some embodiments, the polymer is a self-degrading polymer.

In some embodiments, the polymer comprises a polyester, a polylactide, a polyanhydride, or a combination thereof.

In some embodiments, the composition is introduced into the wellbore as a solution in a hydrocarbon liquid material.

In some embodiments, the hydrocarbon liquid material is diesel fuel or crude oil.

In some embodiments, the composition comprises particles of the at least one alkali metal silicide with an average diameter in the range of 5 micron to 1 centimeter (cm).

In some embodiments, the composition comprises particles of the at least one encapsulated alkali metal silicide with an average diameter in the range of 5 micron to 5 cm.

In some embodiments, the wellbore is sealed after introduction of the composition.

In some embodiments, the present disclosure provides a method of deliquifying a hydrocarbon gas well comprising a wellbore, where hydrocarbon gas flow from the well is impeded due to collection of liquids, including water, in the wellbore. In some embodiments, the method comprises introducing a composition comprising at least one alkali metal silicide into the wellbore, where the at least one alkali metal silicide reacts with water in the wellbore to generate heat and hydrogen gas, thereby displacing the liquids from the wellbore.

In some embodiments, the at least one alkali metal silicide is sodium silicide, lithium silicide, or potassium silicide.

In some embodiments, the composition comprises two or more alkali metal silicides.

In some embodiments, the composition is encapsulated in a polymer.

In some embodiments, the polymer is a self-degrading polymer.

In some embodiments, the polymer comprises a polyester, a polylactide, a polyanhydride, or a combination thereof.

In some embodiments, the composition is introduced into the wellbore as a solution in a hydrocarbon liquid material.

In some embodiments, the hydrocarbon liquid material is diesel fuel or crude oil.

In some embodiments, the composition comprises particles of the at least one alkali metal silicide with an average diameter in the range of 5 micron to 1 cm.

In some embodiments, the wellbore is sealed after introduction of the composition.

In some embodiments, the present disclosure provides a system for introducing alkali metal silicide into a wellbore and receiving hydrocarbon gas from the wellbore. In some embodiments, the system is fluidly coupled to the wellbore and comprises an insertion chamber and a wellhead (or christmas tree) comprising a flow line. In some embodiments, the wellhead (or christmas tree) is configured to receive alkali metal silicide from the insertion chamber and introduce the alkali metal silicide into the wellbore, and the flow line is configured to receive hydrocarbon gas from the wellbore.

In some embodiments, the insertion chamber comprises a first pressure gauge.

In some embodiments, the flow line comprises a second pressure gauge.

In some embodiments, the wellhead (or christmas tree) is configured to receive the alkali metal silicide from the insertion chamber once a pre-determined pressure is measured within the insertion chamber by the first pressure gauge.

In some embodiments, the insertion chamber is configured to be sealed after the alkali metal silicide is inserted in the insertion chamber.

BRIEF DESCRIPTION OF THE DRAWINGS

FIG. 1 is an illustration of an embodiment of a system for introducing alkali metal silicide into a wellbore and receiving hydrocarbon gas from the wellbore.

DETAILED DESCRIPTION

In some embodiments, the present disclosure provides, among other things, methods and systems to address the problem of reduced flow of hydrocarbon gas due to build-up of liquids in a well. In some embodiments, the present disclosure provides methods for removal of such liquids ("deliquification") without the need for additional drilling or machinery or tubulars. Accordingly, in some embodiments, the present disclosure provides a method for recovering hydrocarbon gas from a subterranean reservoir comprising a wellbore, where the hydrocarbon gas flow from the subterranean reservoir is impeded due to collection of liquids, including water, in the wellbore. In some embodiments, the method comprises introducing a composition comprising at least one alkali metal silicide into the wellbore, where the at least one alkali metal silicide reacts with water in the wellbore to generate heat and hydrogen gas, thereby displacing the liquids from the wellbore and restoring hydrocarbon gas flow from the subterranean reservoir.

As used in the present application, the term "hydrocarbon gas" refers to any natural gas or mixture of gases comprising methane ($CH_4$) or greater level alkanes (for example, ethane, propane, and butane). A hydrocarbon gas can include additional gases, such as carbon dioxide, nitrogen, or helium.

As used in the present application, the term "alkali metal silicide" refers to metal silicides of the alkali metal group, which includes lithium (Li), sodium (Na), and potassium (K). Examples of alkali metal silicides include lithium silicide ($L_{12}S_7$), sodium silicide ($Na_4Si_4$), and potassium silicide ($K_4Si_4$). In some embodiments of the methods described within, it is possible to use alkali metal silicides comprising a combination of alkali metals (for example, Na and Li, Na and K, Li and K). Alkali metal silicides react with water to produce, among other things, hydrogen gas ($H_2$) and heat.

As used in the present application, the term "subterranean reservoir" refers to any reservoir containing hydrocarbon gas. The subterranean reservoir exists below the surface of the earth, and to reach the subterranean reservoir and extract the hydrocarbon gas, a hole is drilled from the surface to the subterranean reservoir. This hole drilled into the surface that provides access to the subterranean reservoir is referred to as the "well" or "wellbore." Some wellbores are equipped with a support along the wall of the wellbore to stabilize it, referred to as "casings."

As used in the present application, the term "self-degrading polymer" refers to a polymer which can be hydrolyzed. For example, in some embodiments, a self-degrading polymer dissolves upon contact with water. In some embodiments, a self-degrading polymer dissolves with respect to time and/or temperature. Examples of self-degrading polymer are polyester, polylactide or polyanhydride.

The present disclosure provides methods for deliquifying hydrocarbon gas wells, and thereby allows for recovery of hydrocarbon gas from a subterranean reservoir, where hydrocarbon gas flow from the subterranean reservoir is impeded due to collection of liquids, including water, in the wellbore. In some embodiments, the method comprises introducing a composition comprising at least one alkali metal silicide into the wellbore, where the at least one alkali metal silicide reacts with water in the wellbore to generate heat and hydrogen gas, thereby displacing the liquids from the wellbore and restoring hydrocarbon gas flow from the subterranean reservoir.

In some embodiments, the at least one alkali metal silicide is sodium silicide, lithium silicide, or potassium silicide. In some embodiments, the at least one alkali metal silicide is sodium silicide. In some embodiments, the at least one alkali metal silicide is lithium silicide. In some embodiments, the at least one alkali metal silicide is potassium silicide.

In some embodiments, the composition comprises two or more alkali metal silicides. For example, in some embodiments, the composition comprises sodium silicide and lithium silicide. In some embodiments, the composition comprises sodium silicide and potassium silicide. In some embodiments, the composition comprises lithium silicide and potassium silicide. In some embodiments, the composition comprises sodium silicide, lithium silicide, and potassium silicide.

In some embodiments, the alkali metal silicide comprises two or more alkali metals. For example, in some embodiments, the alkali metal silicide is a sodium and lithium silicide. In some embodiments, the alkali metal silicide is a sodium and potassium silicide. In some embodiments, the alkali metal silicide is a lithium and potassium silicide. In some embodiments, the alkali metal silicide is a sodium, lithium, and potassium silicide.

In some embodiments, the composition comprises particles of the at least one alkali metal silicide with an average diameter in the range of 5 microns to 1 cm. In some embodiments, the composition comprises particles of the at least one alkali metal silicide with an average diameter in the range of 5 microns to 50 microns. In some embodiments, the composition comprises particles of the at least one alkali metal silicide with an average diameter in the range of 50 microns to 100 microns. In some embodiments, the composition comprises particles of the at least one alkali metal silicide with an average diameter in the range of 100 microns to 1 cm.

In some embodiments, the subterranean reservoir comprises a well comprising a wellbore. In some embodiments, the composition is introduced into the subterranean reservoir via the wellbore. In some embodiments, a separate pump or entry is used to introduce the composition directly into the wellbore. In some embodiments, the wellbore comprises a first pipe for introducing the composition, and a second pipe for extraction of hydrocarbon gas.

As noted, alkali metal silicides are reactive with water. Contact of the alkali metal silicide with water will convert the alkali metal silicide to alkali metal silicate, hydrogen gas, and heat. Without wishing to be bound by any theory, the release of hydrogen gas coupled with heat in the wellbore will either cause disruption of the hydrostatic pressure of the fluid column, increase pressure at the bottomhole, or both, such that hydrocarbon gas is displaced towards the surface.

In some instances, however, it may be beneficial to delay the reaction of the composition. For example, some wellbores are deep, and the composition may require considerable travel time before coming into contact with a fluid column. Additionally, it is desirable in some instances to have the composition travel through the fluid column, such that the alkali metal silicide is released in a location that is between the fluid column and the "trapped" hydrocarbon gas. Accordingly, in some embodiments, the composition is encapsulated in a polymer. In some embodiments, the polymer may serve as a protective layer that delays contacting the alkali metal silicide with water. In some embodiments, the polymer is a self-degrading polymer. For example, the polymer can degrade upon exposure to specific conditions, such as certain temperatures (for example, temperatures encountered in a well can reach 140-160 degrees Celsius (° C.)), or certain liquids (for example, water). For example, in some embodiments, the polymer can degrade upon exposure to water or diesel fluid. In some embodiments, the polymer can degrade over an extended period of time. For example, in some embodiments, the polymer can degrade over the course of 6 or more hours, 8 or more hours, 10 or more hours, 12 or more hours, 24 or more hours, 36 or more hours, 48 or more hours, 72 or more hours. In some embodiments, the polymer comprises a polyester, a polylactide, a polyanhydride, or a combination thereof. In some embodiments, the polymer is a polyester. In some embodiments, the polymer comprises a polylactide. In some embodiments, the polymer comprises a polyanhydride.

In some embodiments, the composition comprises particles of the at least one encapsulated alkali metal silicide with an average diameter in the range of 5 microns to 5 cm.

In some embodiments, the composition is prepared as a solution in a hydrocarbon liquid material. In some embodiments, the solution is introduced into the wellbore. In some embodiments, the solution is introduced into the wellbore using a coil tubing unit. In some embodiments, the hydrocarbon liquid material is diesel fuel or crude oil or a combination thereof. In some embodiments, the hydrocarbon liquid material is diesel fuel. In some embodiments, the hydrocarbon liquid material is crude oil. In some embodiments, the hydrocarbon liquid material is a combination of diesel fuel and crude oil.

A system for receiving hydrocarbon gas from a subterranean reservoir is also provided by the present application. In some embodiments, the present disclosure provides a system for receiving hydrocarbon gas from a wellbore, characterized in that a composition comprising at least one alkali metal silicide has been introduced into the wellbore.

In some embodiments, the present disclosure provides a system for introducing alkali metal silicide into a subterranean reservoir or wellbore. An example system is illustrated in FIG. 1. A wellhead (or christmas tree) 101 is shown fluidly coupled to a wellbore. The wellhead (or christmas tree) 101 is also connected to an insertion chamber 103, which is where the alkali metal silicide is loaded prior to introduction into the wellbore. A valve 102 is configured to open a passage between the insertion chamber 103 and the wellhead (or christmas tree) 101. The insertion chamber 103 is further configured to have a pressure gauge 104 (a first pressure gauge) that reads the pressure within insertion chamber 103. The wellbore comprises a perforated casing 105.

Once the valve 102 is opened, the alkali metal silicide travels down the wellbore via gravity, eventually reaching the fluid column 106. In some embodiments, the initial speed of travel down the wellbore can be increased. For example, once the alkali metal silicide is placed in the insertion chamber 103, water can be added to start reaction with the alkali metal silicide, and the chamber can be sealed. The alkali metal silicide will then begin to react with the water in a closed space, releasing hydrogen gas and heat, thereby building up pressure within the insertion chamber 103. As noted, the pressure within the insertion chamber 103 can be monitored via the pressure gauge 104. Once a specific or pre-determined pressure is reached, the valve 102 can be opened, releasing the alkali metal silicide into the wellbore at a greater speed than when under the sole influence of gravity.

In some embodiments, the alkali metal silicide travels through the wellbore and comes into contact with the fluid column 106. The pressure within the wellbore begins to increase as a result of the reaction in the confined space, in part being confined by the entrained liquids. The pressure within the wellbore can be monitored using a separate pressure gauge 108 (a second pressure gauge) located on a flow line 109. In some embodiments, the wellbore can be sealed after introduction of the alkali metal silicide, thereby increasing the pressure within the wellbore. As fluids or gases rise in the wellbore, or pressure increases, as measured by the pressure gauge 108, gases or liquids can be released by opening valve 107. Gases or liquids, or both, can then travel through flow line 109 for collection or disposal.

Accordingly, in some embodiments, the present disclosure provides a system for introducing alkali metal silicide into a wellbore and receiving hydrocarbon gas from the wellbore. The system includes an insertion chamber and a wellhead (or christmas tree) comprising a flow line, where the wellhead (or christmas tree) is configured to receive alkali metal silicide from the insertion chamber and introduce the alkali metal silicide into the wellbore, and the flow line is configured to receive hydrocarbon gas from the wellbore.

In some embodiments, the insertion chamber further comprises a first pressure gauge.

In some embodiments, the flow line comprises a second pressure gauge.

In some embodiments, the wellhead (or christmas tree) is configured to receive the alkali metal silicide from the insertion chamber once a pre-determined pressure is measured within the insertion chamber by the first pressure gauge. In some embodiments, the pre-determined pressure is a pressure greater than atmospheric pressure, indicating that the alkali metal silicide has reacted with water and produced hydrogen gas. In some embodiments, the pre-determined pressure is a pressure between 1 and 2000 pounds per square inch (psi). In some embodiments, the pre-determined pressure is between 1000 and 2000 psi.

In some embodiments, the insertion chamber is sealed after the alkali metal silicide is inserted into the insertion chamber.

In some embodiments, any of the methods for introducing alkali metal silicide into a wellbore can be performed using any system described within.

The methods and systems described in the present application provide deliquification technologies for wellbores. Without being bound by theory, it is proposed that the systems and methods described in the present application deliquify a wellbore or subterranean reservoir due, in part, to the generation of H2 gas and heat due to the reaction of the alkali metal silicide with water. The H2 gas disrupts the hydrostatic force present in the wellbore, allowing hydrocarbon gases to escape and be collected. Said hydrostatic forces are disrupted due to the increase in pressure provided by generation of heat and H2 gas.

Table 1 illustrates the volume of $H_2$ released due to reaction of alkali metal silicide (for example, sodium silicide) with water. In particular, Table 1 illustrates that 1 gram (g) of hydrogen releases about 22.71 liters (L) of $H_2$ gas. In particular, 22.71 L of $H_2$ gas is calculated at standard temperature and pressure (273.15 Kelvin (K), 101.325 kilopascals (kPa), "STP"). The volume of $H_2$ generated is determined using Avogadro's Law and the ideal gas constant (measured in joules/mol*K ($Jmol^{-1}K^{-1}$)) to calculate molecular volume:

$$V_m = \frac{V}{n} = \frac{RT}{P} = \frac{(8.314 \text{ Jmol}^{-1}\text{K}^{-1})(273.15 \text{ K})}{101.325 \text{ kPa}} = 22.41 \text{ liters/mol}$$

where $V_m$ is the molar volume, V is volume (in liters), n is the number of moles of the gas, R is the ideal gas constant (measured in joules/mol*K ($Jmol^{-1}K^{-1}$)), T is temperature (in Kelvins), and P is pressure (in kilopascals).

TABLE 1

| Molar mass of H | 1 | g/mol |
|---|---|---|
| Weight of H | 1 | g |
| No. of moles of H | 1 | mol |
| T (at STP) | 273.15 | K |
| P (at STP) | 101.325 | kPa |
| Ideal gas volume | 22.71 | L/mol |
| Volume of $H_2$ | 22.71 | L |

Using the data derived from Table 1, Table 2 illustrates the change in pressure due to introduction of $H_2$ gas into a theoretical system, where the original wellhead pressure is 145 psi, and the average fluid temperature is 339.82 K. For 1 mole of sodium silicide, 10 moles of hydrogen gas are generated:

$$Na_4Si_4 + 10H_2O \rightarrow 10H_2 + 2Na_2Si_2O_5 + 1654 \text{(kilojoules/mol)}$$

Table 2 shows that 100 kilograms (kg) of sodium silicide added to a wellbore will generate an increase of 144.21 psi, providing a total pressure of 289.21 psi at the wellhead. The increase in pressure is sufficient to disrupt hydrostatic forces.

TABLE 2

| Outer diameter of tubing | 4.5 | inches |
|---|---|---|
| Inner diameter of tubing | 3.958 | inches |
| Capacity | 0.0152 | barrels oil/feet (bbl/ft) |
| Length of tubing | 1000 | ft |
| Fluid level from bottom | 50 | % |
| Volume of fluid | 1208.303 | L |
| Volume of empty space | 1208.303 | L |
| Volume sodium silicide in Chamber | 58.823 | L |
| Density of sodium silicide | 1.7 | grams/milliliter (g/mL) |
| Weight of sodium silicide in Chamber | 100 | kg |
| Molecular weight of sodium silicide | 204 | g/mol |
| Moles of sodium silicide | 490.2 | mols |
| Moles of $H_2$ generated | 4902.0 | mols |
| Original wellhead pressure | 145 | psi |
| Avg. fluid temperature | 339.82 | K |
| Volume of $H_2$ generated | 13933.9 | L |
| Increase in pressure | 144.21 | psi |
| Total wellhead pressure | 289.21 | psi |

A table providing specific weight amounts of hydrogen gas at various temperatures, pressures, and physical states (for example, liquid or gas) can be found at https://www.engineeringtoolbox.com/hydrogen-H2-density-specific-weight-temperaturepressure-d_2004.html (last accessed Jan. 17, 2019), incorporated by reference herein.

In some embodiments, the present methods and systems intentionally deliver alkali metal silicides to the wellbore and not to the subterranean reservoir. Delivery of alkali metal silicides to the wellbore is advantageous as compared to delivery to the subterannean reservoir. In particular, increased amounts of alkali metal silicide must be used in the subterranean reservoir in order to generate enough pressure to overcome any hydrostatic forces in the wellbore. Moreover, the amounts of alkali metal silicide that must be used risks overpressurization of the subterranean reservoir. Overpressurization of the subterranean reservoir can cause fracturing of the well, or result in a blowout (an uncontrolled release of crude oil or natural gas or both).

In some embodiments, about 100 kg of alkali metal silicide is introduced into the wellbore. In some embodiments, the alkali metal silicide is introduced batchwise. In some embodiments, about 100 kg of alkali metal silicide is introduced into the wellbore batchwise. In some embodiments, about 100 kg of alkali metal silicide is introduced into the wellbore in 10 kg batches. In some embodiments, 10 kg batches of alkali metal silicide are delivered until the wellbore is deliquified.

The foregoing has been a description of certain non-limiting embodiments of the subject matter described within. Accordingly, it is to be understood that the embodiments described in this specification are merely illustrative of the subject matter reported within. Reference to details of the illustrated embodiments is not intended to limit the scope of the claims, which themselves recite those features regarded as essential.

It is contemplated that systems and methods of the claimed subject matter encompass variations and adaptations developed using information from the embodiments described within. Adaptation, modification, or both, of the systems and methods described within may be performed by those of ordinary skill in the relevant art.

Throughout the description, where systems are described as having, including, or comprising specific components, or where methods are described as having, including, or comprising specific steps, it is contemplated that, additionally, there are systems encompassed by the present subject matter that consist essentially of, or consist of, the recited components, and that there are methods encompassed by the present subject matter that consist essentially of, or consist of, the recited processing steps.

It should be understood that the order of steps or order for performing certain action is immaterial so long as any embodiment of the subject matter described within remains operable. Moreover, two or more steps or actions may be conducted simultaneously.

We claim:

1. A method of recovering hydrocarbon gas from a subterranean reservoir comprising a wellbore, the method comprising:
    introducing a composition comprising at least one alkali metal silicide into the wellbore, where the at least one alkali metal silicide reacts with water in the wellbore to generate heat and hydrogen gas, thereby displacing liquids from the wellbore and restoring hydrocarbon gas flow from the subterranean reservoir; and
    recovering hydrocarbon gas from the subterranean reservoir,
        where the hydrocarbon gas flow from the subterranean reservoir is initially impeded due to collection of the liquids, including water, in the wellbore, where the composition is introduced into the wellbore in batches,
where the composition is encapsulated in a self-degrading polymer, and
where about 100 kg of the composition is introduced into the wellbore in 10 kg batches.

2. The method of claim 1, where the at least one alkali metal silicide is sodium silicide, lithium silicide, or potassium silicide,
where the hydrocarbon gas flow comprises H2 gas, and
where H2 gas disrupts the hydrostatic force present in the wellbore, allowing the hydrocarbon gas to escape and be collected.

3. The method of claim 2, where the composition comprises two or more alkali metal silicides.

4. The method of claim 1, where the polymer comprises a polyanhydride.

5. The method of claim 1, where the composition is introduced into the wellbore as a solution in a hydrocarbon liquid material.

6. The method of claim 5, where the hydrocarbon liquid material is diesel fuel or crude oil.

7. The method of claim 1, where the composition comprises particles of the at least one alkali metal silicide with an average diameter in the range of 50 microns to 100 microns.

8. The method of claim 1, where the composition comprises particles of the at least one encapsulated alkali metal silicide with an average diameter in the range of 5 micron to 5 cm.

9. The method of claim 1, where the wellbore is sealed after introduction of the composition.

10. A method of deliquifying a hydrocarbon gas well comprising a wellbore, where hydrocarbon gas flow from the well is impeded due to collection of liquids in the wellbore, the method comprising:
introducing a composition comprising at least one alkali metal silicide into an insertion chamber connected to the wellbore;
increasing pressure within the insertion chamber via a reaction with the at least one alkali metal silicide and water until the pressure reaches a pre-determined pressure, where the reaction generates heat and hydrogen gas; and
releasing the composition into the wellbore, thereby displacing the liquids from the wellbore,
where the composition is encapsulated in a polymer,
where the polymer comprises a polyanhydride, and
where the composition is introduced into the wellbore in batches.

11. The method of claim 10, where the at least one alkali metal silicide is sodium silicide, lithium silicide, or potassium silicide.

12. The method of claim 11, where the composition comprises two or more alkali metal silicides.

13. The method of claim 10, where the polymer comprises a combination of a polylactide and the polyanhydride.

14. The method of claim 10, where the composition is introduced into the wellbore as a solution in a hydrocarbon liquid material.

15. The method of claim 14, where the hydrocarbon liquid material is diesel fuel or oil.

16. The method of claim 10, where the composition comprises particles of the at least one alkali metal silicide with an average diameter in the range of 100 microns to 1 cm.

17. The method of claim 10, where the wellbore is sealed after introduction of the composition.

18. The method of claim 10, where the at one least alkali metal silicide is released into the wellbore at a speed greater than a speed when under the sole influence of gravity.

19. The method of claim 10, where the pre-determined pressure is in a range from about 1 pound per square inch (psi) to about 2000 psi.

20. The method of claim 10, where the polymer is a self-degrading polymer.

21. The method of claim 20, where the polymer degrades over a period of 6 or more hours.

22. A system for introducing at least one alkali metal silicide into a wellbore and receiving hydrocarbon gas from the wellbore, the system being fluidly coupled to a wellbore and comprising:
an insertion chamber;
at least one alkali metal silicide;
a wellhead comprising a flow line, where the wellhead is configured to receive the at least one alkali metal silicide from the insertion chamber and introduce the at least one alkali metal silicide into the wellbore, and the flow line is configured to receive hydrocarbon gas from the wellbore; and
a valve configured to open or close a passage between the insertion chamber and the wellhead, where the valve is located aboveground,
where a center axis of the insertion chamber is parallel to and above a center axis of the wellbore.

23. The system of claim 22, where the insertion chamber comprises a first pressure gauge.

24. The system of claim 23, where the flow line comprises a second pressure gauge.

25. The system of claim 23, where the wellhead is configured to receive the alkali metal silicide from the insertion chamber once a pre-determined pressure is measured within the insertion chamber by the first pressure gauge, and
where the pre-determined pressure is in a range from about 1 pounds per square inch (psi) to about 2000 psi.

26. The system of claim 22, where the insertion chamber is configured to be sealed after the alkali metal silicide is inserted in the insertion chamber.

* * * * *